United States Patent [19]
Monahan

[11] Patent Number: 5,372,634
[45] Date of Patent: Dec. 13, 1994

[54] SONIC APPARATUS FOR DEGASSING LIQUIDS

[75] Inventor: Patrick J. Monahan, Gales Ferry, Conn.

[73] Assignee: The United States of America as represented by the Secretary of the Navy, Washington, D.C.

[21] Appl. No.: 69,817

[22] Filed: Jun. 1, 1993

[51] Int. Cl.⁵ .............................................. B01D 19/00
[52] U.S. Cl. ........................................ 96/175; 55/277; 95/30
[58] Field of Search ............... 55/277; 96/175; 95/29, 95/30

[56] References Cited

U.S. PATENT DOCUMENTS

| | | | |
|---|---|---|---|
| 3,044,236 | 7/1962 | Bearden et al. | 55/277 X |
| 3,238,144 | 3/1966 | Fortman | 96/175 |
| 3,853,500 | 12/1974 | Gassmann et al. | 55/277 X |
| 3,904,392 | 9/1975 | Van Ingen et al. | 95/30 |
| 4,070,167 | 1/1978 | Barbee et al. | 55/277 X |
| 5,085,673 | 2/1992 | Bentley et al. | 55/277 X |
| 5,151,883 | 9/1992 | Mitome | 55/277 X |
| 5,236,473 | 8/1993 | Kraus et al. | 55/277 X |

*Primary Examiner*—Richard L. Chiesa
*Attorney, Agent, or Firm*—Michael J. McGowan; Prithvi C. Lall; Michael F. Oglo

[57] ABSTRACT

There is presented a sonic apparatus for degassing liquids. The apparatus includes a vessel for receiving and releasably retaining an open-top container and adapted to be closed with the container therein, transducer suspension structure positioned in the vessel, an ultrasonic transducer suspended from the structure and disposed in the container spaced from the walls and bottom of the container and beneath the surface of a liquid contained therein. The apparatus further includes a signal generator outside of the vessel for transmitting power to the transducer, and a vacuum pump for maintaining the vessel interior at a vacuum.

3 Claims, 1 Drawing Sheet

SONIC APPARATUS FOR DEGASSING LIQUIDS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The invention relates to apparatus for treating liquids and is directed more particularly to apparatus for acoustically removing gases dissolved or entrained in viscous liquids, such as oils.

(2) Description of the Prior Art

Acoustically removing gases from liquids generally is known in the art. U.S. Pat. No. 3,853,500, issued Dec. 10, 1974 to Hans-Ulrich Gassmann, et al, discloses an apparatus for degassing viscous liquids, the apparatus including a gas tight vessel, means for conveying the viscous liquid from a holding tank to the vessel, ultrasonic oscillators fixed to the outer side wall of the tank, a vacuum pump for maintaining a vacuum in the tank above the level of the liquid, and conduit and pump means for drawing liquid out of the tank.

U.S. Pat. No. 3,904,392, issued Sep. 9, 1975 to Jack A. Vaningen discloses a similar apparatus, but having an ultrasonic transducer fixed to an outer bottom wall of the vessel, the transducer having fixed thereto an ultrasonic horn which protrudes into the vessel from the bottom of the vessel. U.S. Pat. No. 4,070,167, issued Jan. 24, 1978 to Eugene H. Barbee, et al, discloses an apparatus generally similar to the '392 apparatus and having an ultrasonic transducer fixed to the bottom of a well depending from the bottom of the vessel, and a horn extending through the bottom of the well, into the well and into the vessel. In Vaningen and Barbee, the horn imparts acoustic energy to the liquid.

In the systems disclosed in the above-referenced patents, the vessels are sealed and receive liquid conveyed thereto from a holding tank. The systems further include means for pumping the degassed liquid from the vessel to a point of use. The systems generally are permanent installations requiring a substantial area and requiring supporting machinery.

It is deemed beneficial to have available means for degassing small amounts of oil. In military applications it often is necessary to add to an apparatus such as a transformer, or a weapon, or an underwater acoustic device, liquids such as transformer oil, castor oil and silicone oil. The amounts of oil involved are relatively small. It is desirable to remove gases from the oils before introducing them into the apparatus. However, an extensive space-consuming system for degassing is not practical.

Further, attaching an ultrasonic transducer to a wall of a vessel results in part of the acoustic energy of the transducer passing through the walls, resulting in noises radiating from the vessel walls. In military applications, it is at times imperative that radiated noise be at a minimum. It therefore is deemed advantageous to provide a degassing operation which not only is adapted to handle small quantities of liquid in a limited space, but which also includes a transducer separated from the walls, top and bottom of the vessel to reduce radiated noise from the vessel.

SUMMARY OF THE INVENTION

An object of the invention is, therefore, to provide a sonic apparatus for degassing various amounts of liquids.

A further object of the invention is to provide such a sonic apparatus which requires relatively little floor space and relatively little supporting equipment, such as holding tanks, inlet pumps and valves, and outlet pumps and valves.

A still further object of the invention is to provide such an apparatus in which the ultrasonic transducer is suspended in the degassing vessel and not in contact with the top, bottom or walls of the vessel.

With the above and other objects in view, as will hereinafter appear, a feature of the present invention is the provision of a sonic apparatus for degassing liquids, the apparatus comprising a vessel adapted to receive and retain a liquid, transducer suspension structure disposed in the vessel, an ultrasonic transducer adapted to be suspended from the structure and disposed in the vessel spaced from the walls and bottom of the vessel and adapted to be disposed beneath the surface of the liquid in the vessel, means for transmitting power from a signal generator assembly outside of the vessel to the transducer, and vacuum pump means in communication with the interior of the vessel to maintain the vessel above the level of the liquid therein at a vacuum.

In accordance with a further feature of the invention the apparatus vessel is adapted to receive and retain an open-top container with the liquid therein, the vessel being adapted to be closed in substantially gas-tight manner with the container therein and the transducer disposed in the liquid in the container and spaced from the walls and bottom of the container.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawing in which is shown an illustrative embodiment of the invention, from which its novel features and advantages will be apparent. A single FIGURE (FIG. 1) used to illustrate various features of the subject invention is a partly sectional, partly diagrammatic illustration of one form of sonic apparatus for degassing liquids.

DESCRIPTION OF THE PREFERRED EMBODIMENT

Figure 1:
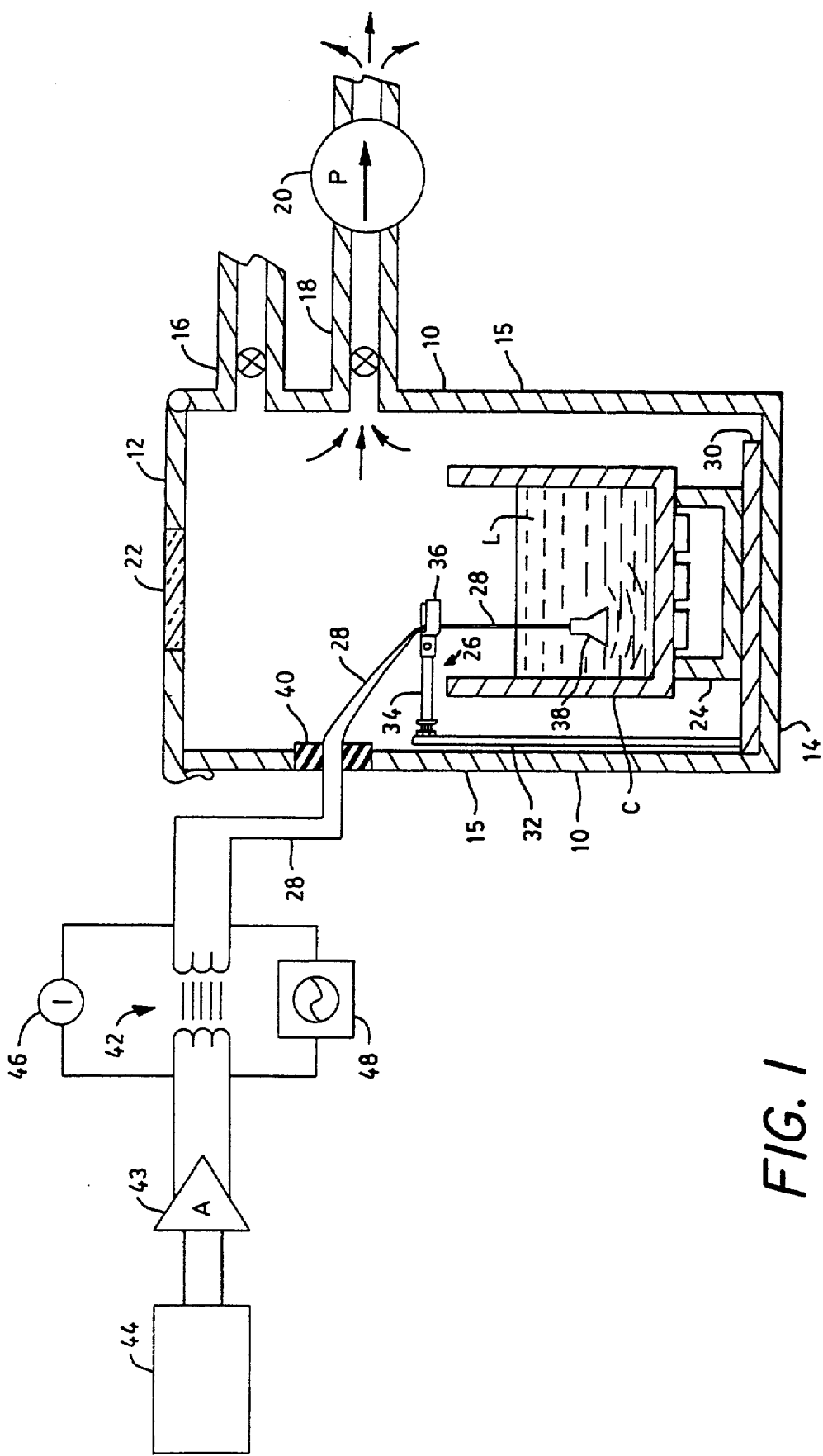

Referring to FIG. 1, it will be seen that the illustrative apparatus includes a vessel 10 having a top portion 12 and a bottom portion 14 interconnected by a cylindrically-shaped side wall 15. Top portion 12 of the vessel may be opened to permit a container C of liquid L to be placed in vessel 10, and may be closed in sealed fashion to render vessel 10 substantiality gas-tight. Vessel 10 is provided with a valved vent 16 and a valved conduit 18 in communication with a vacuum pump 20 adapted to establish and maintain a vacuum in vessel 10.

Top portion 12 of the vessel may be pivotally mounted on vessel 10, or may be bolted onto the vessel and adapted to be removed from the vessel. Top portion 12 preferably is provided with a window 22 by which an operator may view the liquid L in container C.

Vessel 10 may be provided with a base member 24 on which container C is set, removed from vessel bottom portion 14. Also disposed in vessel 10 is a support structure 26 adapted to support a transducer power line 28. The structure 26 includes a base portion 30, a vertical rod portion 32 upstanding from base portion 30, and arm means 34 attached to vertical portion 32. Arm means 34 is adapted to be connected to a selected one of several alternative positions on vertical rod portion 32. Arm means 34 includes a clamp means 36 for retaining transducer power line 28 in a selected position over the top of container C.

Transducer power line 28 has attached to one end thereof an ultrasonic transducer 38. Vessel 10 is provided with a grommet 40 through which power line 28 may extend in a sealed fashion. From outside vessel 10, power line 28 leads to a transformer 42, thence to an amplifier 43, and thence to a signal generator 44. The transducer circuitry typically includes an ammeter 46 and an oscilloscope 48, all used in known fashion to provide controlled and monitored energy to transducer 38.

In operation, an operator opens top portion 12 of vessel 10 and inserts an open-top container C of liquid L to be degassed. Container C may be as small as a one quart oil can or as large as a 55 gallon drum. Container C is set upon base member 24 and arm means 34 is adjusted so as to position transducer 38 in container C such that transducer 38 is disposed in liquid L and spaced from the sides and bottom of the container. Power line 28 is fixed to clamp means 36 and transducer 38 is introduced into liquid L. Top portion 12 is then closed and vacuum pump 20 started. Vent 16 is closed.

Signal generator 44 is activated to power transducer 38 to radiate acoustic energy into liquid L. The acoustic energy output of transducer 38 forms bubbles in liquid L, which rise to the top of the liquid and convert to gas which is drawn off by vacuum pump 20. The operator may view the bubbling of the liquid through window 22 as well as watching for fluctuations in the ammeter, indicating cavitation. Power to the transducer is adjusted so as to keep cavitation under control.

Upon completion of the degassing operation, when the bubbling process stops, vacuum pump 20 is stopped and/or valved conduit 18 is closed and vent 16 is opened to relieve the vacuum in the vessel. Top portion 12 is opened and the transducer is removed from container C. Container C is then lifted from vessel 10 and the degassed liquid used as desired.

In a modified embodiment (not shown) the base member 24 and support structure base portion 30 may be combined, such that base member 24 constitutes a part of the structure 26.

It is to be understood that the present invention is by no means limited to the particular construction herein disclosed and/or shown in the drawings, but also comprises any modifications or equivalents within the scope of the claims.

What is claimed is:

1. A sonic apparatus for degassing a liquid, said apparatus comprising:
    a vessel with means to receive and retain the liquid, and said vessel is provided with means to receive and releasably retain an open-top container of said liquid, said vessel further being provided with means to be closed in a substantially gas-tight manner with said container therein, all of said liquid being in said container;
    a transducer suspension structure positioned in said vessel;
    an ultrasonic transducer suspended from said suspension structure and positioned in said vessel spaced from the walls and bottom of said vessel and positioned beneath the surface liquid in said vessel;
    means for transmitting power from a signal generator assembly outside of said vessel to said transducer; and
    vacuum pump means in communication with the interior of said vessel to maintain said vessel above the level of said liquid therein at a vacuum.

2. The sonic apparatus in accordance with claim 1 wherein said transducer is positioned in said liquid in said container and spaced from the walls and bottom of said container.

3. The sonic apparatus in accordance with claim 1 wherein said transducer is hung from said suspension structure by a transducer power line.

* * * * *